Figure 1:
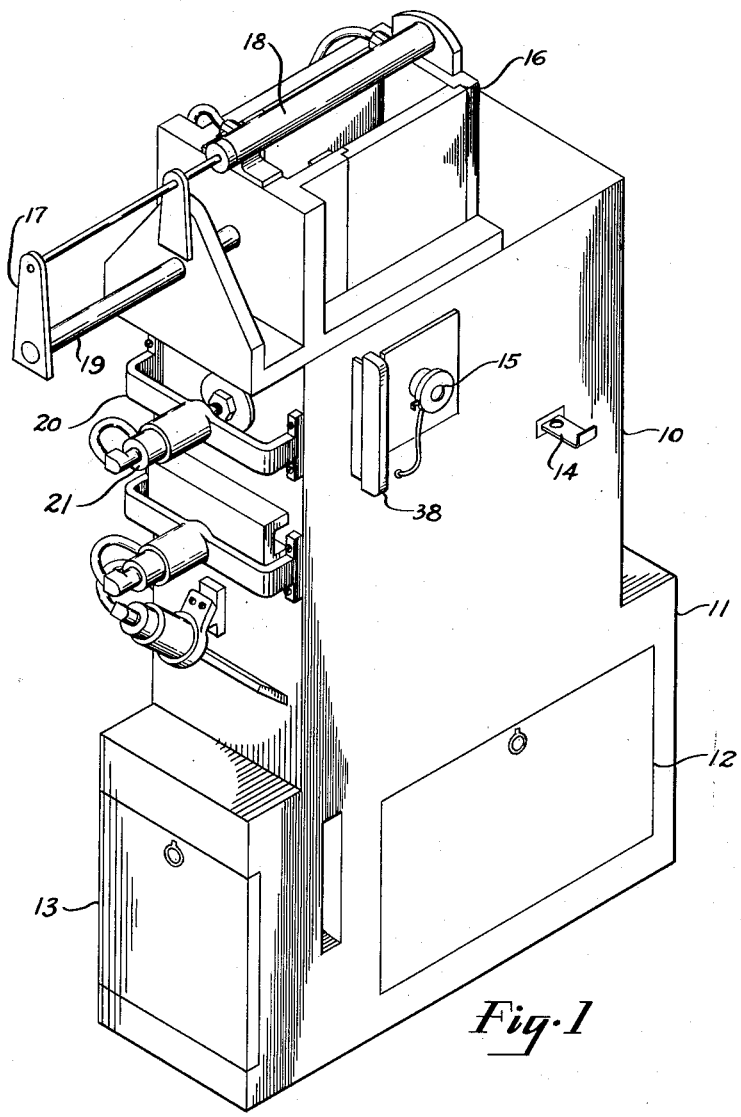

Aug. 28, 1956    R. A. HAWN    2,760,418
PHOTOGRAPHIC APPARATUS
Filed March 17, 1952    4 Sheets-Sheet 1

INVENTOR.
RALPH A. HAWN
BY Fay & Fay
ATTORNEYS

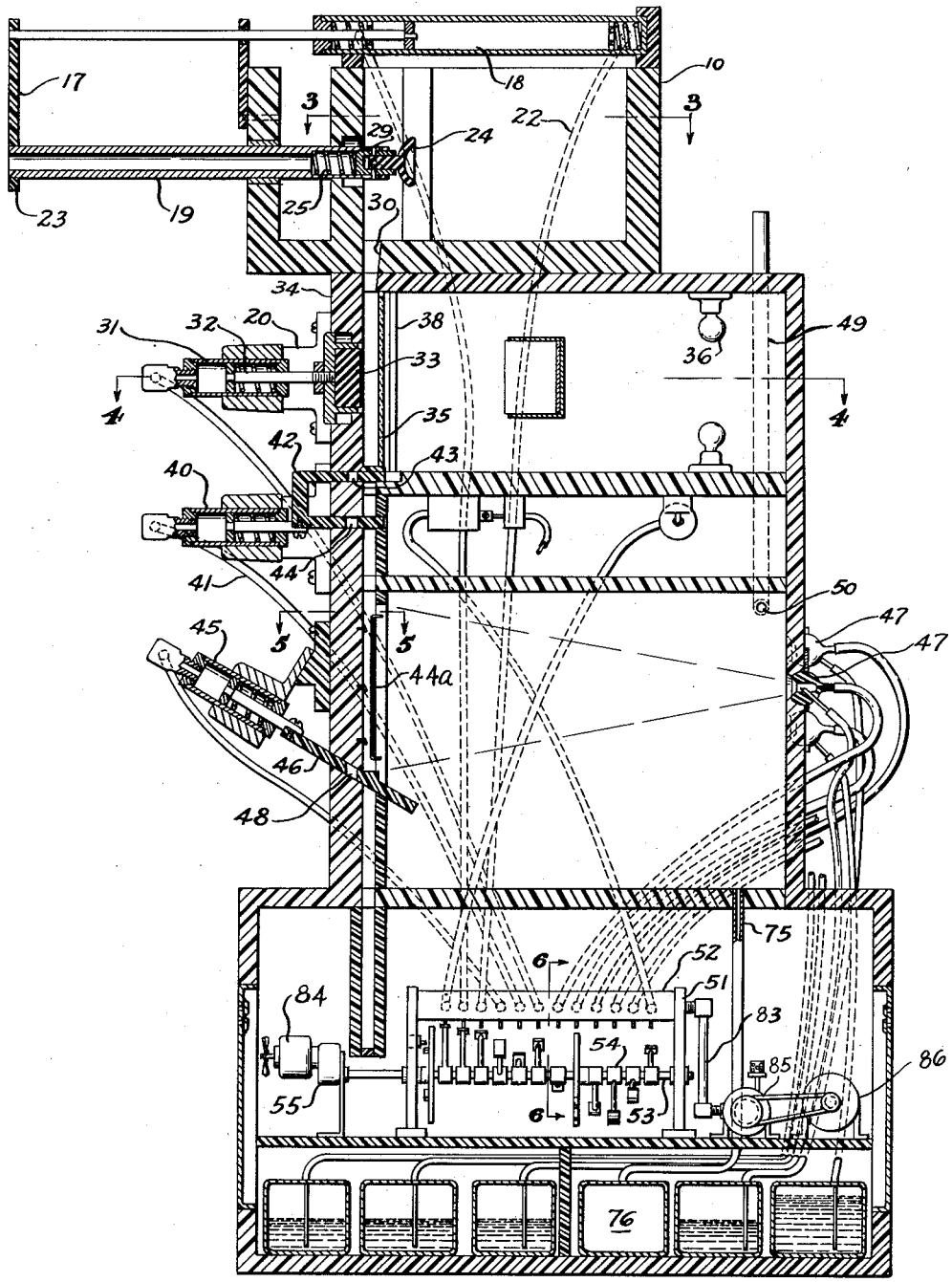
Fig·2

INVENTOR.
RALPH A. HAWN
BY Fay & Fay
ATTORNEYS

Aug. 28, 1956  R. A. HAWN  2,760,418
PHOTOGRAPHIC APPARATUS
Filed March 17, 1952  4 Sheets-Sheet 4

INVENTOR.
RALPH A. HAWN
BY
*Fay & Fay*
ATTORNEYS

United States Patent Office 2,760,418
Patented Aug. 28, 1956

2,760,418

PHOTOGRAPHIC APPARATUS

Ralph A. Hawn, Cleveland, Ohio, assignor to
William L. Ulmer

Application March 17, 1952, Serial No. 276,980

4 Claims. (Cl. 95—14)

This invention relates, as indicated, to a photographic apparatus adapted to expose, develop and deliver photographs automatically. More particularly the invention is adapted for the taking, developing and finishing of a portrait of a person and possibly with the addition of certain identification indicia in a minimum of time and with dependable results. This apparatus may be used in stores, transportation centers and the like where people congregate and are anxious to have an inexpensive photograph of themselves, and also may be used for identification cards and the like, where certain information is needed, possibly together with fingerprints and a photograph of the individual for positive identification.

The invention includes an apparatus for the taking of sharp and clear photographs and developing the same as positives. It also includes the serial steps necessary for taking the photographs successfully, processing them downwardly through a series of chambers in which spray developing with the various chemicals will be used. It embodies the principle of the use of compressed air in a series of valves and chambers for the movement of the photographic paper through the timed cycle.

The principal object of the present invention is to produce a photographic apparatus adapted for the rapid production of portraits singly or in succession and the finishing of the same in a uniform manner where uniformly good results may be obtained.

A further object of the invention is to provide means for producing identification records, including a portrait and individual verification markings, such as fingerprints whereby verification can be had of an individual with a minimum of cost and complication and at a high rate of speed.

A further object of the invention is to provide a dependable automatic apparatus to make successful portraits of individuals under uniform conditions with rapidity and with a high enough degree of technical perfection so that they will be commercially acceptable. Further, it is necessary that the apparatus be as faultless as is humanly possible since machines of this general type have been known in the past to have innumerable impractical difficulties in their operation.

A further object of the invention is to make an automatic photographic apparatus which will operate on a rapid cycle to take photographs and develop them with a spray developing process and deliver them rapidly with perfection.

A further object of this invention is to provide an apparatus with an automatically timed cycle for taking the picture, turning on the illumination where necessary, and subsequently developing the picture with an automatic spray processing cycle, said apparatus using a source of compressed air to operate the timed cycle to deliver the photograph.

To the accomplishment of the foregoing and related ends said invention then consists of the means and methods hereinafter fully described and particularly pointed out in the claims, the annexed drawings and the following description, setting forth in detail certain mechanisms embodying the invention, such disclosed means and methods constituting, however, but one of the various forms in which the principle of the invention may be used.

Figure 7:
Figure 8:
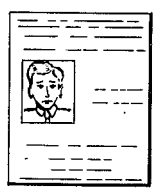
Figure 9:
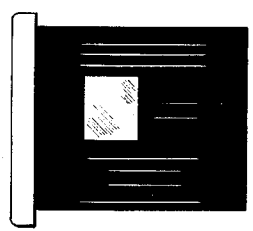
Figure 4:
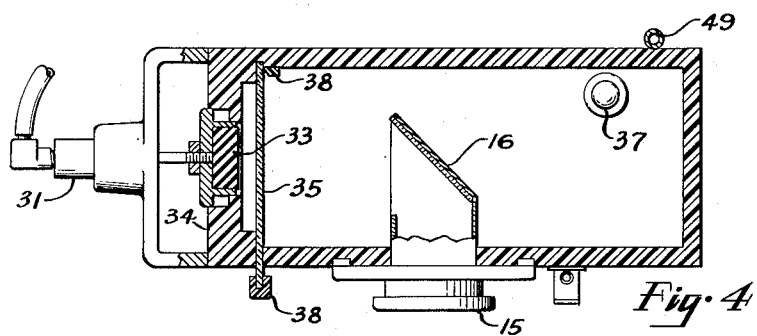
Figure 3:
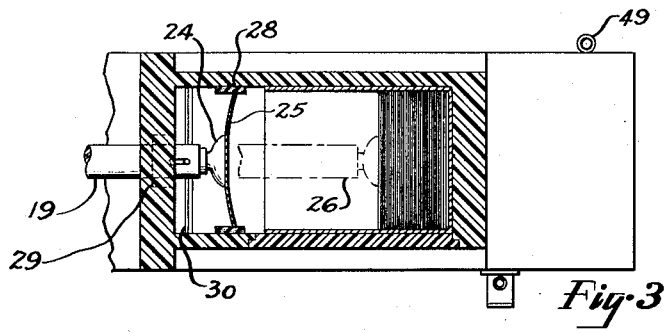
Figure 5:
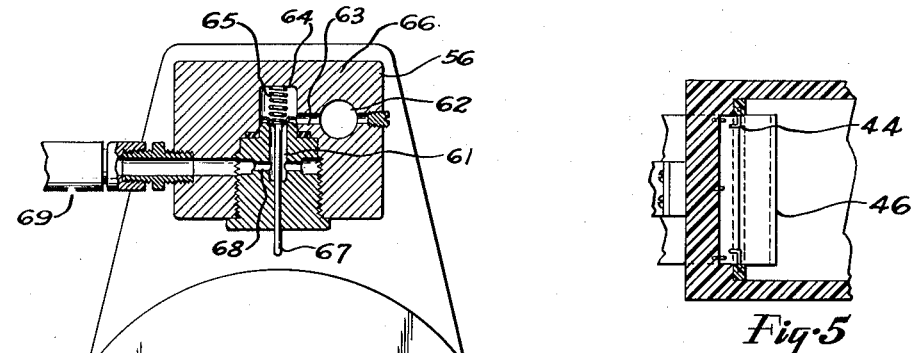
Figure 6:
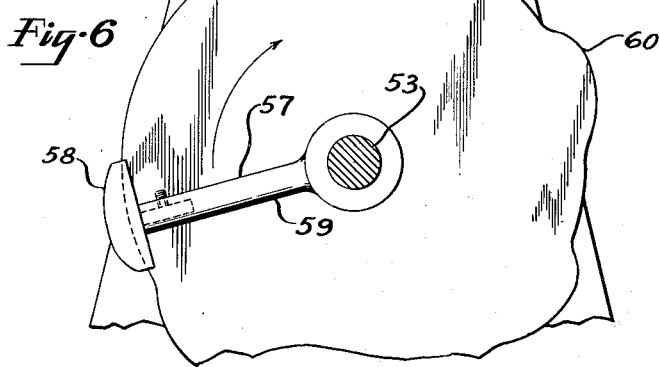
Figure 10:
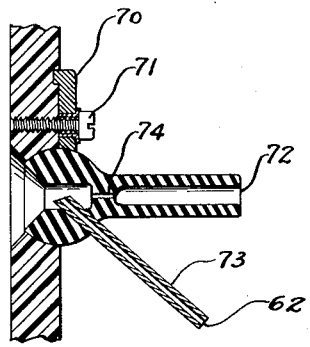
Figure 12:
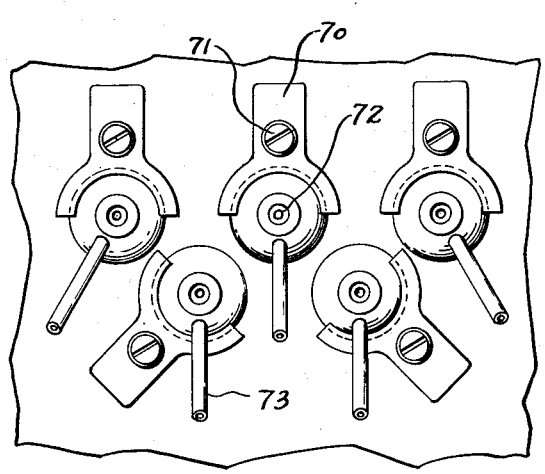
Figure 11:
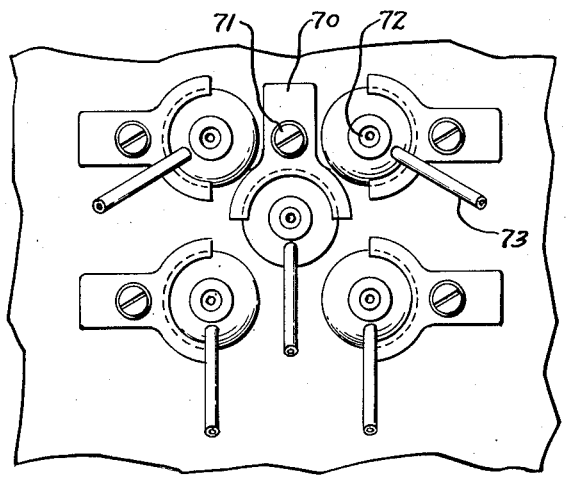

In said annexed drawings:

Fig. 1 is a perspective view of the exterior of the picture taking and developing means without the associated booth in which the individual's picture would be taken normally, Fig. 2 is a cross-sectional view through this picture taking and developing apparatus, in which the lower compartment showing control means and developing tanks is greatly foreshortened, Fig. 3 is a cross-sectional view along the line 3—3 of Fig. 2, Fig. 4 is a cross-sectional view of the lens and picture taking compartment, Fig. 5 is a cross-sectional view of the holding means for the exposed picture in developing, Fig. 6 is a cross-sectional view of a valve and cam means to operate the picture taking cycle, Fig. 7 is a view of a picture as it might be reproduced from this apparatus, Fig. 8 is another view of an identification card with personal data and a portrait on one segment thereof, Fig. 9 is the plate which is used to cover up a portion of the identification card on which the personal indicia is located, Fig. 10 is a cross-sectional view of the spray nozzle and its mounting yoke, Fig. 11 is a rear view of the arrangement of nozzles in the spray developing chamber, and Fig. 12 is a rear view of an alternate arrangement in the spray developing chamber.

The general operation of this photographic apparatus is by means of an air pump, a manifold system and a multiplicity of cams shown more particularly in Fig. 6, to operate the various air cylinders for movement of the photograph material through the picture taking and developing cycle. This cycle also includes a spray developer and a plurality of nozzles which force the various photograph chemicals in a spray or mist upon the photograph material to develop it. The particular means for taking a single sheet of photograph material from a stack, dropping it behind the lens, taking the picture, dropping it further into the spray chamber and following that into the delivery chute, will be explained as the operation of the apparatus becomes more clear from the subsequent figures.

Fig. 1 is an overall view of the apparatus to be described herein. This view eliminates the necessary booth which would be used to surround the person to be photographed, to provide the proper degree of illumination, proper height and focus for the camera, so that a high degree of uniformity in picture taking will be possible. The principal features of the apparatus are shown herein.

Fig. 2 is a cross-section of this apparatus with the lower portion considerably foreshortened, illustrating the component parts more schematically than is actually the case. The remaining figures are cross-sectional views of particular parts of the apparatus and will be described as the overall apparatus is made clear.

Fig. 1 shows a front view of the apparatus in a box or chamber 10 having an enlarged bottom portion 11 with openings on the front 12 and on the sides 13. These probably would be provided with keys or other arrangement to prevent them from being tampered with, and coin slot 14 would actuate the starting of the timed cycle for the illumination of the subject, the taking of the picture and the other sequential steps necessary. This timed cycle takes place in thirty to ninety seconds, depending principally upon the speed of the film, though other factors may enter into the actual time it takes to take a picture, develop it and deliver it to a person.

The principal components of the apparatus consist of a lens with various adjustments 15, an upper compartment 16 having a U frame and air cylinder generally designated 17, the air cylinder being designated 18, with a piston member 19 and a suction cup, not shown, attached thereto for guiding a single positive of photographic material into the apparatus. The compartment immediately below the photographic material compartment is the camera, and has on one end thereof a support bracket 20 and an air cylinder 21 with a connecting air hose to a source of compressed air or gas. The reason for the air cylinder in this compartment is to grab the sensitized photographic material and push it against a glass plate, where it will be in focus with the subject through mirrors and a lens.

The compartment immediately below this is the spray developing compartment and makes use of two air cylinders for the operation of the feed into and out of the compartment. Not shown in this picture and on the extreme right side of the apparatus, are the air hoses to the spray nozzles.

In the lower compartment are the operating means, consisting of blowers and the manifold system to force air into the various compartments operating the cylinders, to move the picture from one step to another, as well as to spray the various photographic chemicals and solutions upon the picture to develop it. There are two access doors 12 and 13 to permit checking and repairing of the apparatus, particularly to refill bottles of the various developing solutions as this becomes necessary.

This apparatus is particularly made clear in connection with Fig. 2 where the upper chamber 16 has an air cylinder and yoke generally designated 17, the air cylinder being particularly designated 18. This is connected by two air hoses, one of which is designated 22, to the manifold system shortly to be described. The operating means 17 has an extension member 23 connected to a piston member 19 and on the extreme end thereof there is a suction cup 24 mounted by means of a pin to the piston in a sliding connection having a spring 25 to absorb the recoil of the suction cup as it contacts the sensitized material to pick off a single sheet thereof for feeding the photographic apparatus. The details of this can be seen particularly in Fig. 3, which is a cross-sectional view of the compartment. A single sheet of photographic material designated 25 is shown in this view attached to the suction cup 24. The extended position of the piston 19 and suction cup 24 is seen at 26, where it contacts the stack of sensitized photographic material. Along the sides of this compartment there would be a sponge rubber section 28 on either side of the compartment in the event that one or more sheets of sensitized material are attached to the suction cup, it would be removed as it passes this part of the chamber. When the cylinder and piston move to the farthest position possible to the left in Figs. 2 and 3, the suction cup recedes into the wall of the chamber 29 and thus breaks the suction on the paper. The recess 29 is of corresponding size and shape to the diameter of the suction cup and its depth.

Once the sheet of sensitized material is released from the suction cup, it falls down by gravity through slot 30 to the camera. At this position, which is particularly shown in Fig. 2 and in cross-section in Fig. 4, there is an air cylinder 31 mounted on a yoke 20 adapted to reciprocate a piston 32. On the outer end of this piston there is a block of hard material 33. Between the outer wall 34 and the inner glass plate 35 there is a space into which the single sheet of photographic material will fall. At the next instant in the timed cycle, air cylinder 31 forces piston 32 and its elastomer block 33 against the photographic paper in contact with the glass plate 35. At this time it will be in focus if a subject is seated at the correct focal length for the setting in the camera. Within the camera there is a lens 15 and an angulated mirror 16 which directs the image of the person to be photographed upon the sensitized paper. Within the camera there may be various forms of illumination, including bulbs 36 and 37 which are particularly adapted to light up for a timed interval the indicia upon a plate which is inserted immediately in front of the sensitized paper through glass plate 35. This plate is shown at 38 and may be seen more clearly in Fig. 1 at the same point. It may be inserted through the wall in the compartment and is of a size and shape such as is shown in Fig. 9. By this method certain indicia may be photographed upon the sensitized paper as well as the image of the subject being photographed and they may be correlated to serve for identification means. It is not necessary, however, to use this blank or shield if only a photograph is required without the addition of the indicia to it.

At the next point in the timed cycle air cylinder 40, operated by air hose 41 through the manifold shortly to be described, moves forward in the U frame 42, which has a double opening shown at 43 and 44. This permits the sensitized paper, upon its release from air cylinder 31 following retraction, to drop from the camera downwardly into a plurality of wire holders 44a shown in the photographic developing chamber proper. Mounted exteriorly of the chamber is another air cylinder 45 having a spring to return the air cylinder to its original position upon release of the air pressure therein. Said cylinder is connected through a piston to a sliding door 46. This cylinder and door are mounted at a 60° angle to the vertical to prevent the water or liquid from the chamber in escaping by means of this door. At the extreme right of the chamber are a plurality of nozzles 47 shown more particularly in Fig. 10 in detail. In all there are five or six nozzles arranged in one or more patterns as shown in connection with Figs. 11 and 12. Basically the nozzle consists of a water inlet and an air inlet, the air sucking the water into a divergent outlet which is focused upon the photographic paper to be developed. The various steps in this developing cycle will be described shortly. The picture is mounted in various wire holders 44, shown to the left of the picture, that hold the sensitized paper and prevent it from crinkling or warping out of shape as it is being developed, to permit the picture to pass through in its vertical passageway to the outlet chute. The cross-section of this arrangement is shown in Fig. 5 where there is shown at 44 the retaining wires on one side with additional wires on the rear surface thereof, usually two or three, vertical wires mounted in the case to hold the sensitized paper away from the wall. The outer wires prevent the paper from warping and falling accidentally into the compartment proper. The angulated outlet door 46 is shown here and when pressure is applied to the air cylinder 45 it moves the piston, forcing the door 46 so that an opening 48 registers with the vertical chute permitting the picture to drop therethrough.

This delivery follows the cycle of development, which is a spray of developing chemicals and solutions of the usual type for this process, which is forced upon the sensitized paper by operation or one of the cams on the manifold to force air to a nozzle, thus creating a vacuum, which forces the developer solution onto the sensitized paper. Following a spray of developer chemicals and solutions there is a short water spray, which is forced on in a similar manner and following this is a spray from still another cam and another nozzle for the bleaching solution. After this there is a similar water spray as before. Next come the clearing solution and then another water spray, and finally the toner and stilll another water spray. Each of these occurs in turn and in a very few seconds the cycle is completed. After releasing the air cylinder 45, the picture drops into the outlet chute, as described above, and the operation of the cycle is completed. The entire cycle can be repeated any number of times, once the cycle is restarted. This consists of actuating a micro switch to turn on the blower and to revolve the shaft, causing the cams to contact the manifold about to be described, as well as to start any auxiliary equipment which may be needed, such as an exhaust for the developing chamber, which has been found to be convenient. This exhaust is shown at 49 through the auxiliary apparatus needed to remove the moist air with developing chemicals therein, is not shown. There is an outlet at 50 from the developing chamber. The operation of the manifold system is approximately as follows:

A U frame 51 is mounted upon a manifold 52 and a shaft 53. Upon the shaft at spaced intervals there are cams, one of which is shown at 54. These cams number about twelve, though a few more or less may be required for such auxiliary operations as are necessary. The shaft is driven by means of a motor 84 of constant speed and may have reducing gears to adjust the speed or to set the speed which may be necessary to complete the time cycle. The reducing gears are shown at 55 in a housing. The manifold 52 is connected by means of an air hose 83 to a blower 85, which has a power source 86. Compressed air is forced from the blower into the manifold 52 and at spaced intervals along the manifold are valves generally designated 56 shown particularly in Fig. 6, which is a cross section of this manifold and cam arrangement. Fig. 6 shows a single cam designated 57 having a cam portion 58, which may be of any circumferential length desired, and has an arm 59 attached to the shaft 53. One of the cams immediately behind cam 57 is a complete circle and has one or more, perhaps as many as three or four cam portions, designated generally 60. This operates the manifold to force compressed air into the water spray. The water spray alternates between the spray of the various chemicals and thus occurs more frequently than the others in the same cycle. All of the cams operate for various intervals of time, and for this reason circumferential length may vary somewhat. As the cam portion contacts valve generally designated 66, it forces it up, permitting air from the manifold 62 to pass by means of passageway 63 into the inner chamber 64. Mounted therein is a spring 65 and a valve proper 67. As the cam contacts the valve, it permits air to pass into the inner passageway 61 and through outlet 68 to air hose 69 and thence to the appropriate nozzle or air cylinder. By this means compressed air, or it could be gas, is forced to a plurality of air cylinders, which may be of the single acting or double acting type, moving a cylinder to the right or left for a timed interval and then returning either under their own spring pressure or pressure from the opposite direction.

The specific design of the nozzles is shown particularly in Fig. 10. The nozzle 47 is made of rubber and has a yoke holder 70 mounted by a cap screw 71 to the wall of the box. This holder permits the nozzle to be adjusted to reach all portions of the sensitized paper. Air enters through connection 73 and the water or developer chemicals and solutions, as the case may be, through connection 73 into the inner recess of the nozzle. As the air is forced out the tiny aperture 74 to the immediate vicinity of the widened portion that surrounds the end of the fluid passage 73, the liquid is atomized and forced out of the sharply divergent orifice of the nozzle to spray the mist of liquid at a stated angle, which will primarily cover the size of the sensitized paper being developed. Even though these nozzles are spaced one from another, in the manner shown in Figs. 11 and 12, each nozzle covers the entire area of the picture. The liquid which is in the developer chamber passes by means of an outlet 75 to a separate storage tank 76. The liquid chemicals are shown in the bottom portions of the chamber and are permitted access through doors 12 and 13, so that the chemicals may be added to periodically as required.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:
1. In an automatic photographic apparatus with picture-taking and development means associated therewith; a vertical chute; a storage chamber for sensitized paper at the upper end thereof; air operated suction cup on one side of said chute; a storage compartment for sensitized photographic material on the other side thereof; means for advancing said suction cup against the paper and withdrawing same to the vertical chute; a recess on one side of the chute to permit the suction cup to retract therein, dropping the sensitized material into the chute; clamping means for said sensitized material in the camera; means for exposing the sensitized material; releasing means for said material into the vertical chute to the spray developing chamber; retaining means within said chamber to allow the sensitized material to be developed, said developing means consisting of a plurality of spray nozzles with accompanying apparatus for spraying the photographic chemicals and solutions, and releasing means from said developing chamber at the lower end of the vertical chute.

2. In a feed mechanism for an automatic photographic apparatus for the taking and developing of sensitized material; the combination with a vertical chute for the passage of the sensitized material during the steps of the operation, which consists of a horizontal chamber at one end thereof for the storage of sensitized paper and an air operated cylinder, piston and suction cup on the other side thereof, projecting through one wall of the chamber, recessed in said wall of greater depth than the depth of the suction cup on said piston; means for advancing said air cylinder piston and suction cup to the sensitized material and for retracting same to the recess in said wall, releasing the same by breaking the suction on said material to permit the passage of said material to the subsequent operation in the apparatus.

3. In a feed mechanism for an automatic photographic apparatus for the taking and developing of sensitized material; the combination with a vertical chute for the passage of the sensitized material during the steps of the operation, which consist of a horizontal chamber at one end thereof for the storage of sensitized paper and an air operated cylinder, piston and suction cup on the other side thereof, projecting through one wall of the chamber, recessed in said wall of greater depth than the depth of the suction cup on said piston; means for advancing said air cylinder and suction cup to the sensitized material and for retracting the same to the recess in said wall; sponge rubber separators projecting from the walls of the horizontal chamber into the path of the sensitized material for separating the sheets one from another, so that only a single sheet of sensitized material may pass through the chute, whereby retraction of the cylinder into the recessed wall breaks the suction on said material to permit the passage thereof to the subsequent operation in the apparatus.

4. In an automatic apparatus for the taking and developing of photographs by a series of steps, the combination of a vertical chute for the passage of said sensitized material; a chamber on one side of said chute; air operated valve means on the opposite side of said chamber; retaining means in said chamber for the sensitized material during development; spray means for the sequential spraying of the developing chemicals and solutions; said air operated cylinder being connected to a slotted plate at an angle to the chute whereby upon completion of the developing steps, the air cylinder moves the angulated plate forward to the slotted opening for discharge of the sensitized material through the vertical chute, said angulated support protecting the chamber from the admission of light and possible leakage of the development chemicals and solutions therefrom.

References Cited in the file of this patent

UNITED STATES PATENTS

| | | |
|---|---|---|
| 1,209,419 | Farguhar | Dec. 10, 1916 |
| 2,016,029 | Vassakos | Oct. 1, 1935 |
| 2,218,656 | Pifer | Oct. 22, 1940 |
| 2,473,174 | Pifer | June 14, 1949 |
| 2,499,021 | Fletcher | Feb. 28, 1950 |
| 2,540,124 | Klein | Feb. 6, 1951 |
| 2,552,644 | Ofldt | May 15, 1951 |
| 2,631,511 | Tuttle | Mar. 17, 1953 |

FOREIGN PATENTS

| | | |
|---|---|---|
| 109,228 | Austria | Apr. 10, 1928 |